US012594996B2

(12) United States Patent
Yoshida et al.

(10) Patent No.: US 12,594,996 B2
(45) Date of Patent: Apr. 7, 2026

(54) VEHICLE FRONT STRUCTURE

(71) Applicant: Honda Motor Co., Ltd., Tokyo (JP)

(72) Inventors: Shinjiro Yoshida, Tokyo (JP); Junichiro Araki, Tokyo (JP); Kotaro Iwakiri, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/963,814

(22) Filed: Nov. 29, 2024

(65) Prior Publication Data

US 2025/0304174 A1 Oct. 2, 2025

(30) Foreign Application Priority Data

Mar. 27, 2024 (CN) .......................... 202410355073.6

(51) Int. Cl.
B62D 21/15 (2006.01)
B62D 21/11 (2006.01)

(52) U.S. Cl.
CPC ............ B62D 21/155 (2013.01); B62D 21/11 (2013.01)

(58) Field of Classification Search
CPC .... B62D 21/155; B62D 21/11; B62D 25/088; B62D 21/02; B62D 21/15; B62D 25/145
See application file for complete search history.

(56) References Cited

U.S. PATENT DOCUMENTS

| 9,676,418 | B1 * | 6/2017 | Mohammed | ........... | B62D 25/08 |
| 2019/0126989 | A1 * | 5/2019 | Okura | .................... | B62D 25/08 |

FOREIGN PATENT DOCUMENTS

| EP | 2419291 | B1 * | 9/2014 | ............... | B60K 1/04 |
| JP | 5827424 | | 12/2015 | | |
| JP | 5827424 | B2 * | 12/2015 | ............... | B60K 1/00 |

* cited by examiner

*Primary Examiner* — Jason D Shanske
*Assistant Examiner* — Scott Lawrence Strickler
(74) *Attorney, Agent, or Firm* — JCIPRNET

(57) ABSTRACT

The invention provides a vehicle front structure having good collision safety performance. The vehicle front structure includes: a pair of left and right suspension support members used to support a suspension device of a vehicle; a side frame connected to the suspension support members and extended toward a front of the vehicle; a cross beam connected to the pair of left and right suspension support members in a vehicle width direction, and the cross beam is disposed separately from the side frame above the side frame; and a driving source fixing part used to fix a driving source for driving the vehicle and disposed on the cross beam.

11 Claims, 7 Drawing Sheets

VEHICLE FRONT STRUCTURE

CROSS-REFERENCE TO RELATED APPLICATION

This application claims the priority benefit of China application serial no. 202410355073.6 filed on Mar. 27, 2024. The entirety of the above-mentioned patent application is hereby incorporated by reference herein and made a part of this specification.

BACKGROUND OF THE INVENTION

Field of the Invention

The invention relates to a vehicle front structure.

Description of Related Art

In recent years, efforts to provide access to sustainable transportation systems that also take into account vulnerable persons such as the elderly, disabled, and children among traffic participants are growing. In order to achieve the above object, research and development dedicated to further improving traffic safety or convenience through developments related to collision safety performance are carried out. In the prior art, various related structures have been developed in terms of how the vehicle front structure may safely transfer the collision load during a collision.

For example, Prior Art Literature 1 discloses a vehicle front structure having a structure including a first cross beam and a second cross beam connected to a pair of left and right side frames in the vehicle width direction. When a collision occurs from the front of the vehicle, as the side frames are deformed to absorb the collision load caused by the crushing or bending of the cross-section, the collision load is also transferred to the cross beam connected to the side frame. Also, since the motor of the front chamber is usually driven by high voltage, insulation protection is needed, e.g., when the cross beam and the motor attached thereto are moved to the rear of the vehicle due to input collision load, one area where safe travel may occur needs to be provided. Moreover, if the motor is not to move in the event of a collision, the fixed part (in the above structure, the cross beam) of the motor needs to be designed to be strong enough to avoid deformation. However, the absorption of balanced collision load is impacted as a result. Therefore, the above structure needs to take into account a design that may balance the absorption of collision load via the deformation of the side frames and the movement of the motor during a collision, thus increasing development time and cost.

The present application aims to improve collision safety performance in order to solve the issues, and, in turn, contribute to the development of sustainable delivery systems.

PRIOR ART LITERATURE

Patent Literature

[Patent Literature 1] Japanese Invention No. 5827424

SUMMARY OF THE INVENTION

The invention provides a vehicle front structure having good collision safety performance.

The invention provides a vehicle front structure. The vehicle front structure includes: a pair of left and right suspension support members used to support a suspension device of a vehicle; a side frame connected to the suspension support members and extended toward a front of the vehicle; a cross beam connected to the pair of left and right suspension support members in a vehicle width direction, and the cross beam is disposed separately from the side frame above the side frame; and a driving source fixing part used to fix a driving source for driving the vehicle and disposed on the cross beam.

In an embodiment of the invention, the driving source fixing part includes a first fixing part disposed on the cross beam and a second fixing part disposed on the suspension support members, and when viewed from a side of the vehicle, the driving source is disposed on a reference line connected to the first fixing part and the second fixing part.

In an embodiment of the invention, the vehicle front structure further includes: an upper frame connected to the suspension support members and extended toward the front of the vehicle; and a vertical connecting member connected to a front end of the upper frame and a front end of the side frame, and when viewed from a side of the vehicle, the cross beam is disposed in an area defined by the upper frame and the side frame in a vehicle height direction and disposed separately from the upper frame.

In an embodiment of the invention, the vehicle front structure further includes: a cross beam connecting part connecting the suspension support members to a cross beam rear end part disposed at a rear end of the cross beam; a side frame connecting part connecting the suspension support members to a side frame rear end part disposed at a rear end of the side frame; an upper frame connecting part connecting the suspension support members to an upper frame rear end part disposed at a rear end of the upper frame, and the cross beam connecting part is disposed further forward of the vehicle than the side frame connecting part and/or the upper frame connecting part.

In an embodiment of the invention, the vehicle front structure further includes: a connecting frame extended from a lower surface of the side frame toward a bottom of the vehicle; and a lower cross beam connected to the pair of left and right connecting frames in a vehicle width direction, and a front end of the lower cross beam and a front end of the connecting frame are disposed at a same position in a vehicle length direction.

In an embodiment of the invention, the vehicle front structure further includes: a lower frame connected to the lower cross beam and extended toward the front of the vehicle, and the lower frame is extended parallel to the side frame and disposed at an inside of the connecting frame in the vehicle width direction.

In an embodiment of the invention, the vehicle front structure further includes: a side frame connecting part connecting the suspension support member to a side frame rear end part disposed at a rear end of the side frame. The suspension support member includes: a rear end fixing part connecting a rear end of the suspension support members to a front pillar and/or a side beam of the vehicle; and a plate member connected to the side frame connecting part and the rear end fixing part and extended in a vehicle length direction.

In an embodiment of the invention, the suspension support members have an upper support part supporting an upper arm of the suspension device, and when viewed from a side of the vehicle, the upper support part is disposed in a rear end area of the side frame, and the rear end area of the side frame is defined by a reference line extended along a vehicle length direction from a rear end of an upper surface of the side frame and a reference line extended along the vehicle length direction from a rear end of a lower surface of the side frame.

In an embodiment of the invention, the suspension support members have a lower support part supporting a lower arm of the suspension device, and when viewed from the side of the vehicle, the lower support part is disposed in a rear end area of the lower frame, and the rear end area of the lower frame is defined by a reference line extended along a vehicle length direction from a rear end of an upper surface of the lower frame and a reference line extended along the vehicle length direction from a rear end of a lower surface of the lower frame.

In an embodiment of the invention, the side frame includes an upper surface, a lower surface, an inner surface at an inside of the vehicle width direction, and an outer surface at an outside of the vehicle width direction, when viewed from the side of the vehicle, the plate member has an upper rib extended toward a rear of the vehicle from between the cross beam connecting part and the side frame connecting part, and a lower rib extended toward the rear of the vehicle from below the side frame connecting part, inner parts of the upper rib and the lower rib in the vehicle width direction are disposed in the same vehicle width direction as an inner surface of the side frame near the side frame connecting part, and outer parts of the upper rib and the lower rib in the vehicle width direction are disposed in the same vehicle width direction as an outer surface of the side frame near the side frame connecting part.

In an embodiment of the invention, a distance of the upper rib of the suspension support member in a vehicle width direction is decreased toward a direction of the plate member toward the rear of the vehicle.

Based on the above, in an embodiment of the invention, the vehicle front structure may be formed into a structure in which the cross beam and the driving source are not connected to the side frame by arranging the relative positions of the side frame, the cross beam, and the driving source fixing part. In this way, in the event of a collision, the deformation of the side frame and the movement of the driving source may be independently taken into account and controlled. Moreover, in the present embodiment, since the cross beam is disposed above the side frame, when the driving source is approximately elliptical when viewed from the side, by supporting and fixing the driving source in such a way that the driving source has a longer dimension in the vehicle height direction, the vehicle front structure may achieve a structure of a short overhang device shortening the space forward of the axle center of the front wheel. Furthermore, the cross beam is not placed in the transmission path of the collision load, so there is no crushed residue in front of the cross beam. Furthermore, when the area from the front end part of the cross beam to the rear part of the vehicle serves as a retention area of crushed residue between the side frame connecting part and/or the upper frame connecting part, the entire area of the side frame used as an impact-absorbing member absorbing a collision load may be used as an impact-absorbing area. Therefore, a structure of a short overhang device may be achieved and movement and deformation of the cross beam and the driving source due to the input of a collision load may be suppressed.

In order to make the above features and advantages of the invention better understood, embodiments are specifically provided below with reference to figures for detailed description as follows.

4

DESCRIPTION OF THE EMBODIMENTS

Figure 1:
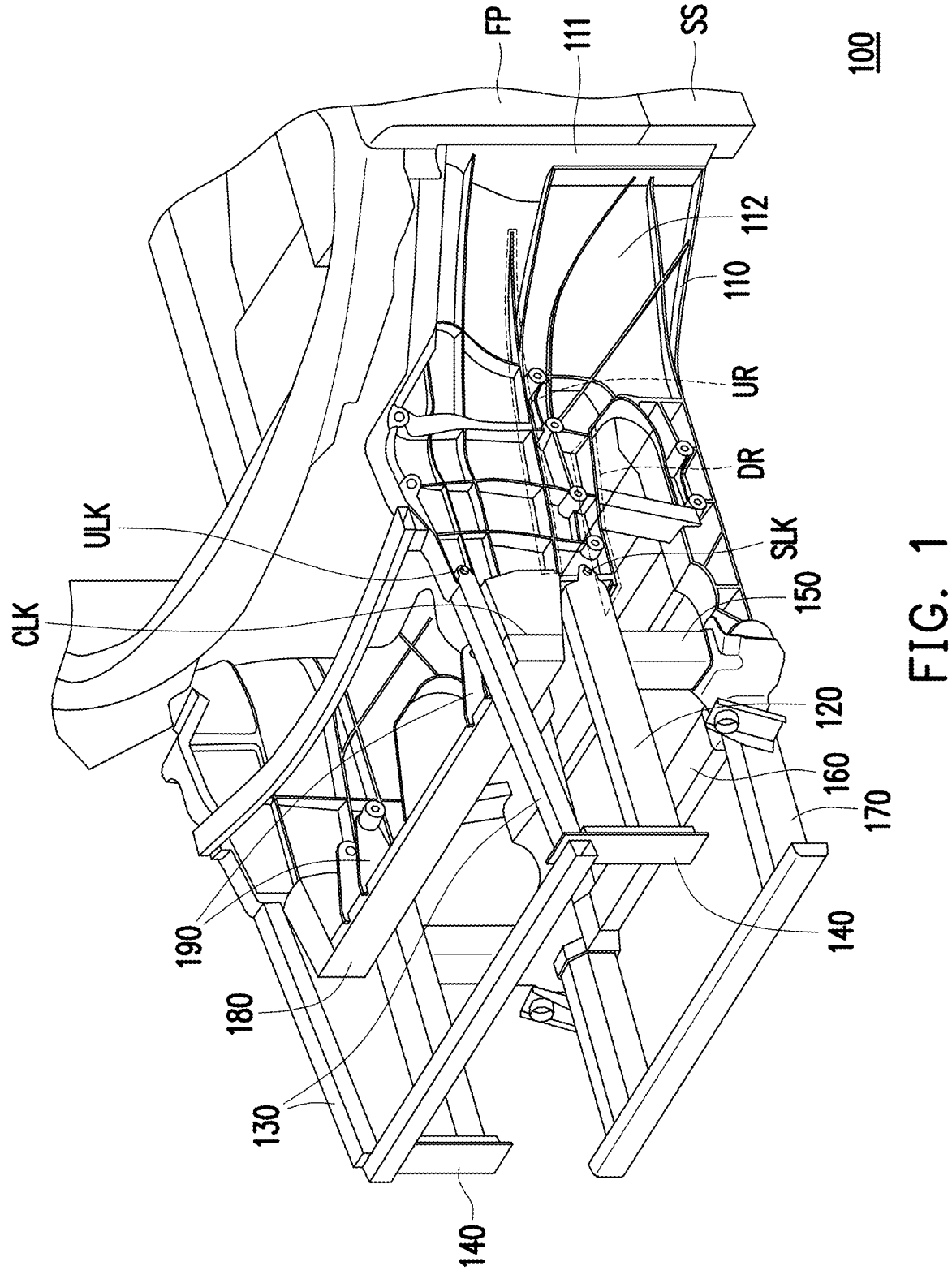
FIG. 1 is a schematic structural diagram of a vehicle front structure according to an embodiment of the invention.
Figure 2:
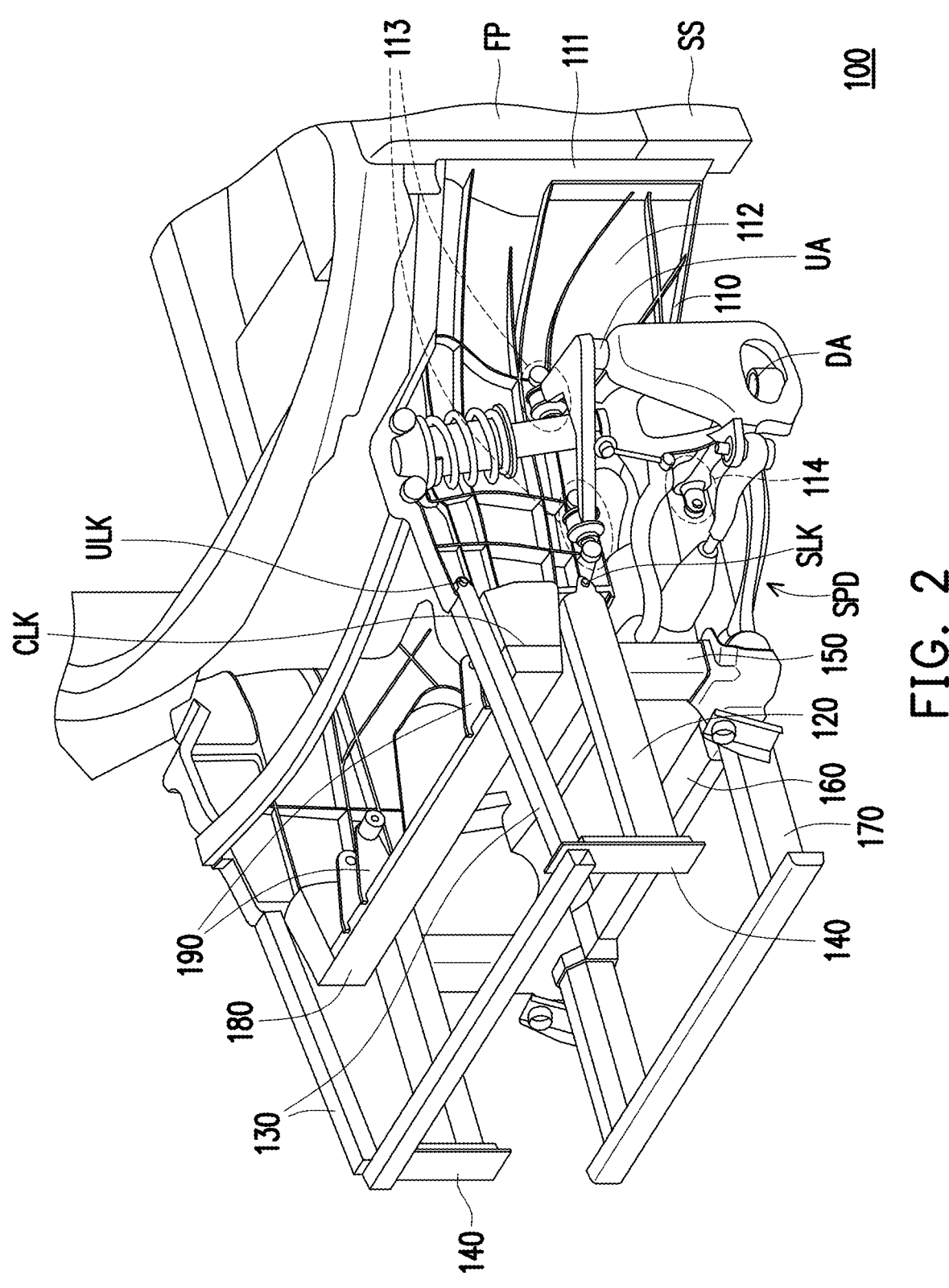
FIG. 2 is a structural schematic diagram of a suspension device of a vehicle mounted at the vehicle front structure of FIG. 1.
Figure 3:
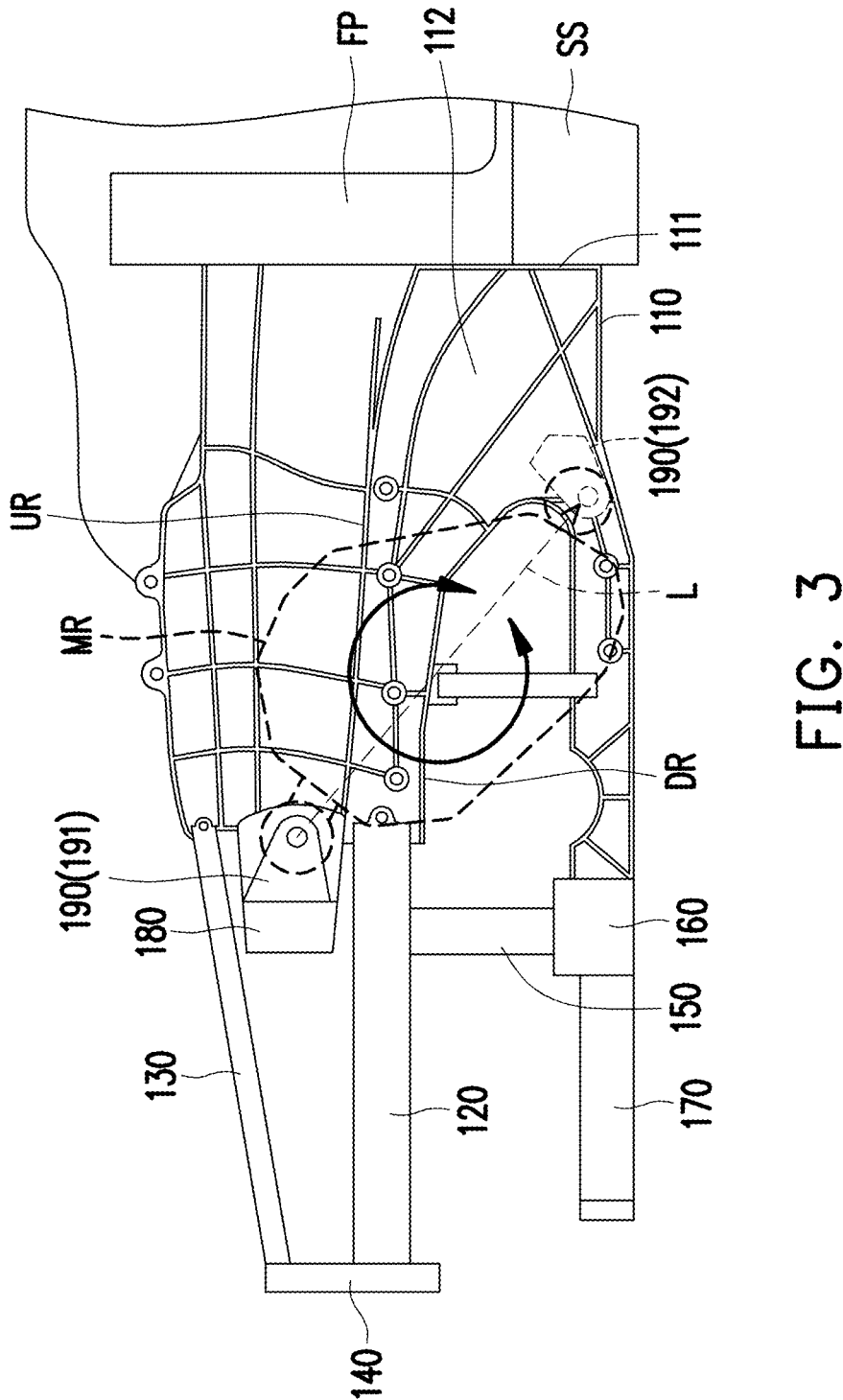
FIG. 3 is a schematic side view of a driving source mounted at the vehicle front structure of FIG. 1.
Figure 4:
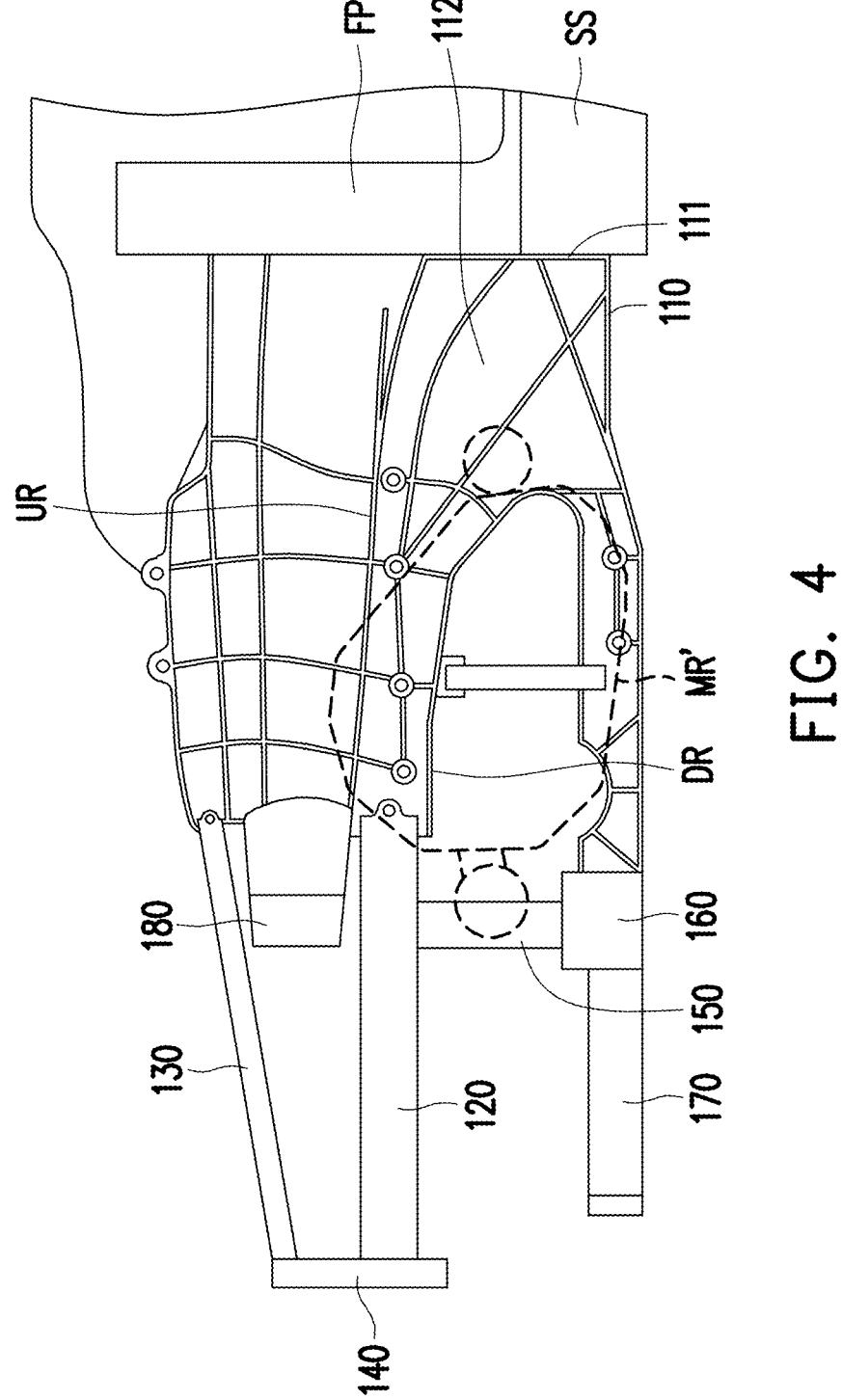
FIG. 4 is a schematic side view of a driving source mounted at the vehicle front structure of FIG. 1 according to a comparative example.
Figure 5:
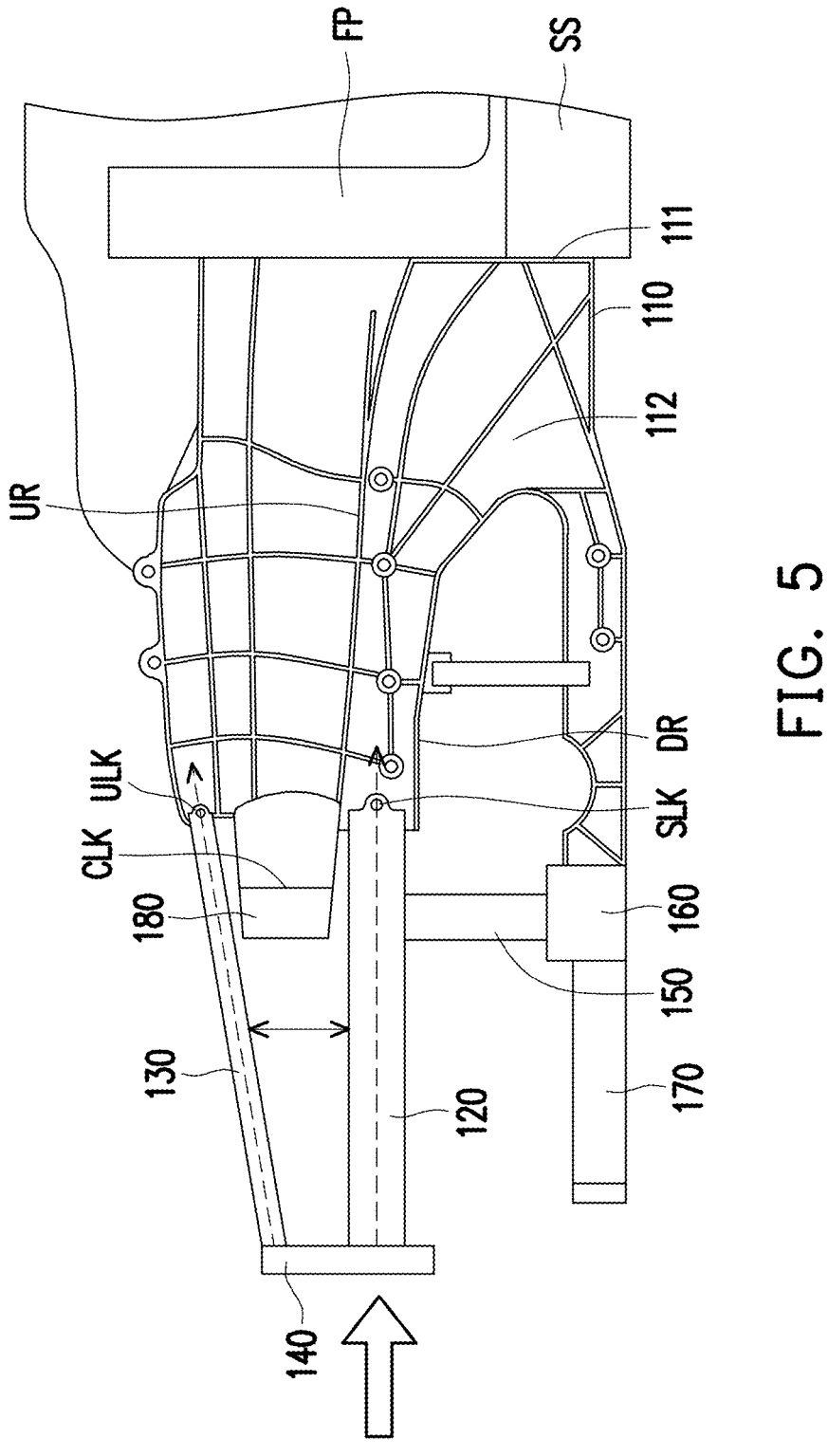
FIG. 5 is a schematic diagram of the load transfer path of the vehicle front structure of FIG. 1 when a collision occurs.
Figure 6:
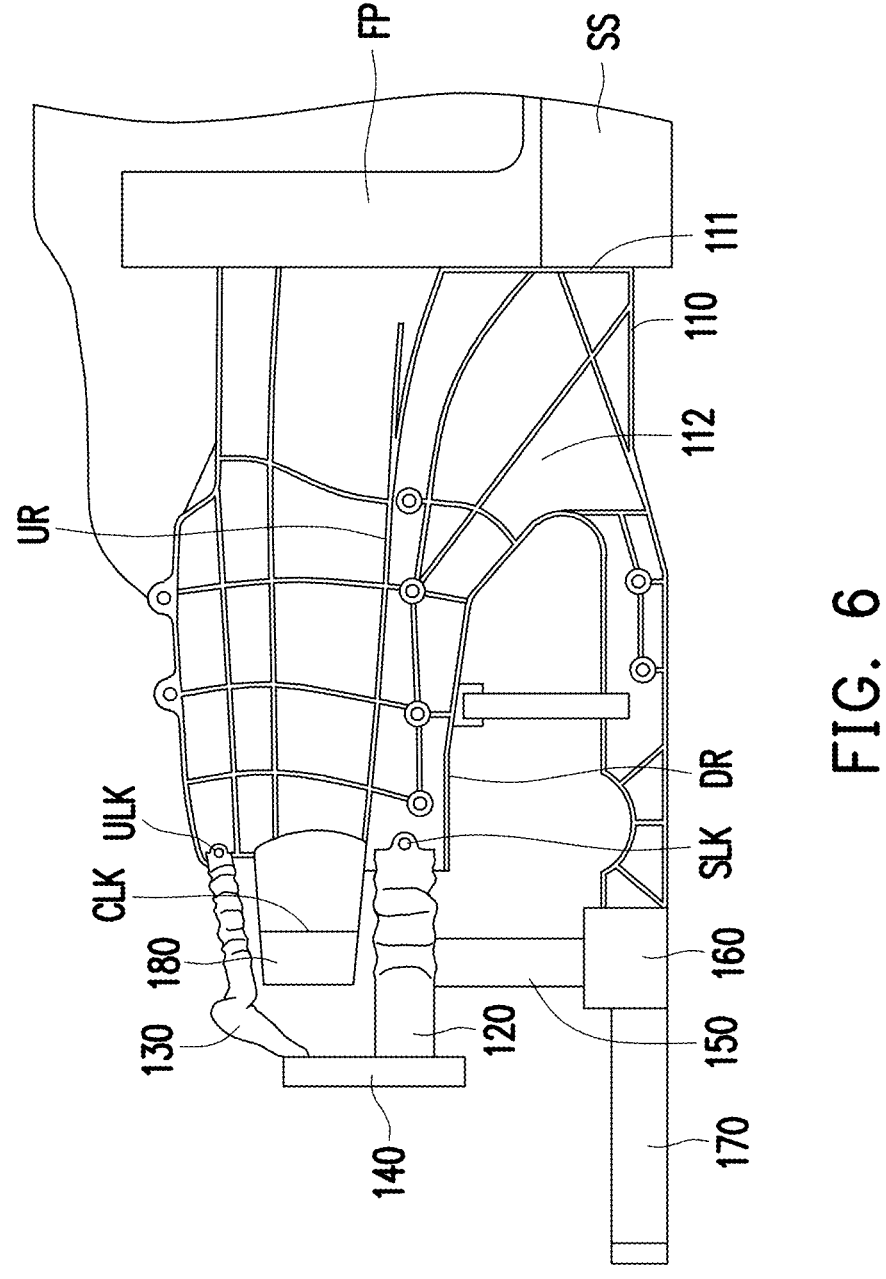
FIG. 6 is a schematic view of the retention area where crushed residue is generated when the upper frame and the side frame of FIG. 5 are collided.
Figure 7:
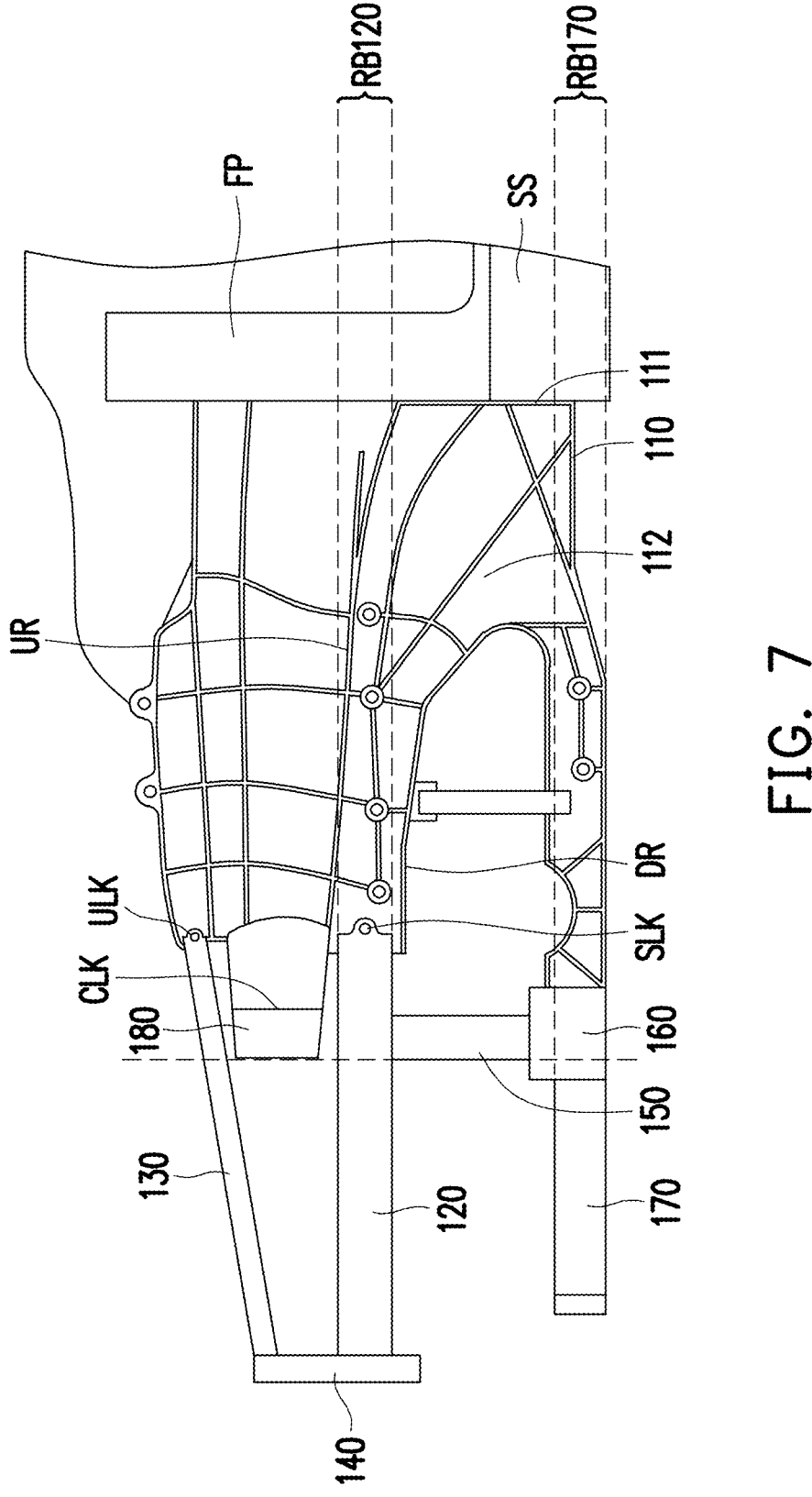
FIG. 7 is a schematic diagram of the area where the upper support part, the lower support part, the upper rib, and the lower rib of the suspension support members of FIG. 1 are located.

FIG. 1 is a schematic structural diagram of a vehicle front structure according to an embodiment of the invention. FIG. 2 is a structural schematic diagram of a suspension device of a vehicle mounted at the vehicle front structure of FIG. 1. FIG. 3 is a schematic side view of a driving source mounted at the vehicle front structure of FIG. 1. FIG. 4 is a schematic side view of a driving source mounted at the vehicle front structure of FIG. 1 according to a comparative example. FIG. 5 is a schematic diagram of the load transfer path of the vehicle front structure of FIG. 1 when a collision occurs. FIG. 6 is a schematic view of the retention area where crushed residue is generated when the upper frame and the side frame of FIG. 5 are collided. FIG. 7 is a schematic diagram of the area where the upper support part, the lower support part, the upper rib, and the lower rib of the suspension support members of FIG. 1 are located. It should be noted that, for the sake of convenience below, the front and rear directions, the inside and outside directions, and the up and down directions of the vehicle seat are defined as shown in the figures, and the configuration of each part is explained based on these definitions. The front and rear directions, the left and right directions, and the up and down directions of the vehicle seat are respectively equivalent to the vehicle length direction, the vehicle width direction, and the vehicle height direction.

Please refer to FIG. 1. In the present embodiment, a vehicle front structure 100 includes a pair of left and right suspension support members 110, a side frame 120, an upper frame 130, a vertical connecting member 140, a connecting frame 150, a lower cross beam 160, a lower frame 170, and a cross beam 180. Specifically, as shown in FIG. 1 and FIG. 2, in the present embodiment, the pair of left and right suspension support members 110 are used to support a suspension device SPD of the vehicle. The upper frame 130 and the side frame 120 are respectively connected to the suspension support members 110 at different positions in the vehicle height direction and extended toward the front of the vehicle. The vertical connecting member 140 is connected to the front end of the upper frame 130 and the front end of the side frame 120. The connecting frame 150 is extended from the lower surface of the side frame 120 toward the bottom of the vehicle. The lower cross beam 160 is connected to the pair of left and right connecting frames 150 in the vehicle width direction, and the front end of the lower cross beam 160 and the front end of the connecting frame 150 are disposed at the same position in the vehicle length direction. The lower frame 170 is connected to the lower cross beam 160 and extended toward the front of the vehicle, and the lower frame 170 is extended parallel to the side frame 120 and disposed inside the connecting frame 150 in the vehicle width direction. The cross beam 180 is connected to the pair of left and right suspension support members 110 in the vehicle width direction, and the cross beam 180 is disposed separately from the side frame 120 above the side frame 120. When viewed from the side of the vehicle, the cross beam 180 is disposed in an area defined by the upper frame 130 and the side frame 120 in the vehicle height direction, and disposed separately from the upper frame 130.

Moreover, as shown in FIG. 3, in the present embodiment, the vehicle front structure 100 further includes a driving source fixing part 190. The driving source fixing part 190 is used to fix a driving source MR driving the vehicle and disposed on the cross beam 180. In the present embodiment, the driving source MR is a motor. As a result, in the present embodiment, by arranging the relative positions of the side frame 120, the cross beam 180, and the driving source fixing part 190, a structure in which the cross beam 180 and the driving source MR are not connected to the side frame 120, and the driving source MR is fixed to the cross beam 180 and the suspension support members 110 may be formed. In this way, in the event of a collision, the deformation of the side frame 120 and the movement of the driving source MR may be independently taken into account and controlled. Specifically, when a collision occurs, the side frame 120 absorbs the collision load and is deformed, thereby the driving source MR may be prevented from moving. Moreover, in the present embodiment, since the cross beam 180 is disposed above the side frame 120, when the driving source MR is approximately elliptical when viewed from the side, by supporting and fixing the driving source MR in such a way that the driving source MR has a longer dimension in the vehicle height direction, compared with the mounting method of a driving source MR' shown in FIG. 4, the vehicle front structure 100 may achieve a structure of a short overhang device shortening the space forward of the axle center of the front wheel.

In addition, as shown in FIG. 3, in the present embodiment, the driving source fixing part 190 includes a first fixing part 191 disposed on the cross beam 180 and a second fixing part 192 disposed on the suspension support members 110, and when viewed from the side of the vehicle, the driving source MR is disposed on a reference line L connected to the first fixing part 191 and the second fixing part 192. In the present embodiment, the driving force output from the driving source MR generates a rotational torque about the axle, that is, when viewed from the side of the vehicle, the direction thereof is clockwise or counterclockwise rotational torque, and the reaction torque of this rotational torque causes the driving source MR to be rotated. Such rotation of the driving source MR may be appropriately suppressed by sandwiching the driving source MR between the first fixing part 191 and the second fixing part 192. Furthermore, by disposing the driving source MR at a position where the center of the axle passes through an imaginary line, such rotation of the driving source MR may be further suppressed.

Moreover, as shown in FIG. 5, when a collision occurs, the vehicle front structure 100 may transmit the collision load from the front of the vehicle to two directions: the upper frame 130 and the side frame 120, via the configuration of the vertical connecting member 140. Moreover, since the cross beam 180 is disposed in the area between the upper frame 130 and the side frame 120, that is, the cross beam 180 is not disposed on the transmission path of the collision load, the movement and the deformation of the cross beam 180 and the driving source MR due to the input of the collision load may be suppressed.

Moreover, as shown in FIG. 1 and FIG. 2, in the present embodiment, the vehicle front structure 100 further includes a cross beam connecting part CLK, a side frame connecting part SLK, and an upper frame connecting part ULK. The cross beam connecting part CLK connects the suspension support members 110 to the cross beam 180 rear end part disposed at the rear end of the cross beam 180. The side frame connecting part SLK connects the suspension support members 110 to the side frame 120 rear end part disposed at the rear end of the side frame 120. The upper frame connecting part ULK connects the suspension support members 110 to the upper frame 130 rear end part disposed at the rear end of the upper frame 130, and the cross beam connecting part CLK is disposed further forward of the vehicle than the side frame connecting part SLK and/or the upper frame connecting part ULK.

In this way, as shown in FIG. 5 and FIG. 6, when a collision occurs, since the cross beam connecting part CLK is located further forward of the vehicle than the side frame connecting part SLK and/or the upper frame connecting part ULK, the crushed residue of the side frame 120 and the upper frame 130 deformed by the collision load from the front of the vehicle may remain in an area further back than the rear end of the cross beam 180. Furthermore, the cross beam 180 is not placed in the transmission path of the collision load, so there is no crushed residue in front of the cross beam 180. Furthermore, when the area from the front end part of the cross beam 180 to the rear part of the vehicle serves as a retention area of crushed residue between the side frame connecting part SLK and/or the upper frame connecting part ULK, the entire area of the side frame 120 used as an impact-absorbing member absorbing a collision load may be used as an impact-absorbing area. Therefore, a structure of a short overhang device may be achieved.

More specifically, in the conventional structure in which the cross beam is placed on the transmission path of the collision load, since the cross beam is placed at the transmission path of the collision load, crushed residue may be generated in front of the cross beam. As a result, the amount of crushed residue may be extended to the front of the side frame 120, such that the front chamber is expanded and the passenger cabin space is shrunk. Moreover, if the cross beam is moved toward the rear of the vehicle, the positional arrangement of the driving source MR is affected. That is, in the present embodiment, since the cross beam 180 of the vehicle front structure 100 is not placed on the transmission path of the collision load, in the conventional structure, the area behind the side frame 120 provided as the cross beam of the conventional structure no longer has the cross beam 180, and may be used as an impact-absorbing area, and the movement and the deformation of the cross beam 180 and the driving source MR caused by the input of the collision load may be suppressed, such that the vehicle front structure 100 has good collision safety performance.

Moreover, as shown in FIG. 1, FIG. 5, and FIG. 6, in the present embodiment, the suspension support members 110 include a rear end fixing part 111 and a plate member 112. The rear end fixing part 111 connects the rear end of the suspension support members 110 to a front pillar FP and/or a side beam SS of the vehicle, and the plate member 112 connects the side frame connecting part SLK to the rear end fixing part 111 and is extended in the vehicle length direction.

In this way, as shown in FIG. 1 and FIG. 5, in the present embodiment, the suspension support members 110 may transmit the collision load input from the side frame 120 to the front pillar FP and/or the side beam SS located at the rear of the vehicle, the plate member 112 is connected to the side frame connecting part SLK, and a collision load input from the side frame 120 may be distributed and transmitted to a wide range of the rear end fixing part 111 via the curtain surface of the plate member 112. As a comparative example, in a structure in which the collision load is transmitted to the front pillar FP or the side beam SS via the side frame 120 as in a conventional structure, the collision load is concentrated on the connection of the side frame 120 and the front pillar FP, and reinforcement around the area of the connection is needed, thereby increasing the cost.

Moreover, as shown in FIG. 1 and FIG. 7, the front end of the lower cross beam 160 and the front end of the connecting frame 150 are located at substantially the same position in the vehicle length direction. Via the above configuration, the lower cross beam 160 and the connecting frame 150 may form a frame supporting the side frame 120 from below. When viewed from the front of the vehicle, the frame supporting the side frame 120 forms a continuous U-shaped cross-section structure, thereby controlling the direction of deformation of the side frame 120 due to collision load. Here, the specific meaning of controlling the deformation direction of the side frame 120 means, for example, controlling the deformation of the side frame 120 by preventing the side frame 120 from being deformed due to being tilted in the vehicle width direction or the up-down direction due to a collision load.

In addition, as shown in FIG. 1 and FIG. 7, in the present embodiment, since the lower frame 170 is disposed to be extended parallel to the side frame 120, the collision load from the front of the vehicle may be dispersed and transmitted to the side frame 120 and the lower frame 170. Moreover, as shown in FIG. 1, since the lower frame 170 is placed inside the connecting frame 150 in the vehicle width direction, the connecting frame 150 is not placed on the collision load transmission path of the lower frame 170, so there is no crushed residue in front of the connecting frame 150. In an embodiment, after the lower frame 170 is deformed due to the input of the collision load, the collision load is absorbed by moving the crushed residue of the lower frame 170 toward the lower cross beam 160 and the rear of the vehicle. That is, since the connecting frame 150 is not placed on the collision load transmission path of the lower frame 170, the arrangement of the connecting frame 150 does not hinder the movement of the crushed residue of the lower frame 170.

In addition, as shown in FIG. 2 and FIG. 7, in the present embodiment, the side frame 120 includes an upper surface, a lower surface, an inner surface at the inside in the vehicle width direction, and an outer surface at the outside in the vehicle width direction. Moreover, the suspension support members 110 have an upper support part 113 supporting the upper arm UA of the suspension device SPD and a lower support part 114 supporting the lower arm DA of the suspension device SPD. When viewed from the side of the vehicle, the upper support part 113 is disposed in a rear end RB120 of the side frame 120, the rear end area RB120 of the side frame 120 is defined by a reference line extended along the vehicle length direction from the rear end of the upper surface of the side frame 120 and a reference line extended along the vehicle length direction from the rear end of the lower surface of the side frame 120, the lower support part 114 is disposed in a rear end area RB170 of the lower frame 170, and the rear end area RB170 of the lower frame 170 is defined by a reference line extended along the vehicle length direction from the rear end of the upper surface of the lower frame 170 and a reference line extended along the vehicle length direction from the rear end of the lower surface of the lower frame 170.

In general, in a vehicle where the type of the suspension device SPD is a double wishbone type, the upper arm UA and the lower arm DA of the suspension device SPD are designed to have strength and rigidity to support the up and down movement of the tire. Therefore, via the above configuration, the upper support part 113 supporting the upper arm UA of the suspension device SPD may be disposed in the rear end area RB120 of the side frame 120 located on the collision load transmission path, and the lower support part 114 supporting the lower arm DA of the suspension device SPD is disposed in the rear end area RB170 of the lower frame 170 located on the collision load transmission path. Therefore, both the upper arm UA and the lower arm DA of the suspension device SPD may provide a reinforcing effect of suppressing the deformation of the suspension support members 110 due to the collision load from the front of the vehicle, such that the vehicle front structure 100 has good collision safety performance.

Moreover, in the present embodiment, the side frame 120 is a substantially cylindrical member extruded from aluminum material, and the suspension support members 110 are large die-cast aluminum members having a plate-like member provided with a plurality of reinforcing ribs. Therefore, when set to a collision mode in which the side frame 120 is deformed but the suspension support members 110 are not deformed, it is necessary to configure a frame structure that directly transmits the remaining collision load after the side frame 120 is deformed to the front pillar FP.

Therefore, as shown in FIG. 1 and FIG. 7, in the present embodiment, when viewed from the side of the vehicle, the plate member 112 has an upper rib UR extended toward the rear of the vehicle from between the cross beam connecting part CLK and the side frame connecting part SLK, and a lower rib DR extended toward the rear of the vehicle from below the side frame connecting part SLK. As shown in FIG. 1, in the present embodiment, the inner parts of the upper rib UR and the lower rib DR in the vehicle width direction are disposed in the same vehicle width direction as the inner surface of the side frame 120 near the side frame connecting part SLK, and the outer parts of the upper rib UR and the lower rib DR in the vehicle width direction are disposed in the same vehicle width direction as the outer surface of the side frame 120 near the side frame connecting portion SLK. Furthermore, as shown in FIG. 1 and FIG. 7, in the present embodiment, the distance in the vehicle width direction of the upper rib UR of the suspension support members 110 is decreased toward the direction of the plate member 112 toward the rear of the vehicle.

In this way, via the above configuration, the plate member 112 and the upper rib UR and the lower rib and DR thereof form a substantially U-shaped skeleton in such a way that the cross-section thereof is substantially the same as the cross-section formed by the upper surface, the lower surface, and the inner surface of the side frame 120, and the remaining collision load after the deformation of the side frame 120 is directly transferred to the front pillar FP. Furthermore, via a structure in which the distance between the upper rib UR of the plate member 112 in the vehicle width direction is decreased toward the direction of the plate member toward the rear of the vehicle, that is, a structure in which the size of the upper rib UR is reduced in the vehicle width direction may gradually disperse the collision load transmitted from the side frame 120 from the upper rib UR to the plate-shaped member, the collision load may be transmitted to a wide range of the front pillar FP, so that the vehicle front structure 100 has good collision safety performance.

Based on the above, in an embodiment of the invention, the vehicle front structure may be formed into a structure in which the cross beam and the driving source are not connected to the side frame by arranging the relative positions of the side frame, the cross beam, and the driving source fixing part. In this way, in the event of a collision, the deformation of the side frame and the movement of the driving source may be independently taken into account and controlled. Moreover, in the present embodiment, since the cross beam is disposed above the side frame, when the driving source is approximately elliptical when viewed from the side, by supporting and fixing the driving source in such a way that the driving source has a longer dimension in the vehicle height direction, the vehicle front structure may achieve a structure of a short overhang device shortening the space forward of the axle center of the front wheel. Furthermore, the cross beam is not placed in the transmission path of the collision load, so there is no crushed residue in front of the cross beam. Furthermore, when the area from the front end part of the cross beam to the rear part of the vehicle serves as a retention area of crushed residue between the side frame connecting part and/or the upper frame connecting part, the entire area of the side frame used as an impact-absorbing member absorbing a collision load may be used as an impact-absorbing area. Therefore, a structure of a short overhang device may be achieved and movement and deformation of the cross beam and the driving source due to the input of a collision load may be suppressed, thus resulting in good collision safety performance.

Lastly, it should be noted that the above embodiments are used to describe the technical solution of the invention instead of limiting it. Although the invention has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the invention.

What is claimed is:

1. A vehicle front structure, comprising:
a pair of left and right suspension support members used to support a suspension device of a vehicle;
a side frame connected to the suspension support members and extended toward a front of the vehicle;
a cross beam connected to the pair of left and right suspension support members in a vehicle width direction, and the cross beam is disposed separately from the side frame above the side frame; and
a driving source fixing part used to fix a driving source for driving the vehicle and disposed on the cross beam.
2. The vehicle front structure of claim 1, wherein,
the driving source fixing part comprises a first fixing part disposed on the cross beam and a second fixing part disposed on the suspension support members,

when viewed from a side of the vehicle, the driving source is disposed on a reference line connected to the first fixing part and the second fixing part.
3. The vehicle front structure of claim 1, further comprising:
an upper frame connected to the suspension support members and extended toward the front of the vehicle; and
a vertical connecting member connected to a front end of the upper frame and a front end of the side frame,
when viewed from a side of the vehicle, the cross beam is disposed in an area defined by the upper frame and the side frame in a vehicle height direction and disposed separately from the upper frame.
4. The vehicle front structure of claim 3, further comprising:
a cross beam connecting part connecting the suspension support members to a cross beam rear end part disposed at a rear end of the cross beam;
a side frame connecting part connecting the suspension support members to a side frame rear end part disposed at a rear end of the side frame; and
an upper frame connecting part connecting the suspension support members to an upper frame rear end part disposed at a rear end of the upper frame,
the cross beam connecting part is disposed further forward of the vehicle than the side frame connecting part and/or the upper frame connecting part.
5. The vehicle front structure of claim 4, further comprising:
a connecting frame extended from a lower surface of the side frame toward a bottom of the vehicle; and
a lower cross beam connected to the pair of left and right connecting frames in a vehicle width direction,
a front end of the lower cross beam and a front end of the connecting frame are disposed at a same position in a vehicle length direction.
6. The vehicle front structure of claim 5, further comprising:
a lower frame connected to the lower cross beam and extended toward the front of the vehicle,
the lower frame is extended parallel to the side frame and disposed at an inside of the connecting frame in the vehicle width direction.
7. The vehicle front structure of claim 1, further comprising:
a side frame connecting part connecting the suspension support members to a side frame rear end part disposed at a rear end of the side frame,
the suspension support members comprising:
a rear end fixing part connecting a rear end of the suspension support members to a front pillar and/or a side beam of the vehicle; and
a plate member connected to the side frame connecting part and the rear end fixing part and extended in a vehicle length direction.
8. The vehicle front structure of claim 7, wherein the suspension support members have an upper support part supporting an upper arm of the suspension device,
when viewed from a side of the vehicle, the upper support part is disposed in a rear end area of the side frame, the rear end area of the side frame is defined by a reference line extended along a vehicle length direction from a rear end of an upper surface of the side frame and a reference line extended along the vehicle length direction from a rear end of a lower surface of the side frame.

9. The vehicle front structure of claim 6, wherein the suspension support members have a lower support part supporting a lower arm of the suspension device, when viewed from the side of the vehicle, the lower support part is disposed in a rear end area of the lower frame, the rear end area of the lower frame is defined by a reference line extended along a vehicle length direction from a rear end of an upper surface of the lower frame and a reference line extended along the vehicle length direction from a rear end of a lower surface of the lower frame.

10. The vehicle front structure of claim 8, wherein the side frame comprises an upper surface, a lower surface, an inner surface at an inside of the vehicle width direction, and an outer surface at an outside of the vehicle width direction, when viewed from the side of the vehicle, the plate member has an upper rib extended toward a rear of the vehicle from between the cross beam connecting part and the side frame connecting part, and a lower rib extended toward the rear of the vehicle from below the side frame connecting part, inner parts of the upper rib and the lower rib in the vehicle width direction are disposed in the same vehicle width direction as an inner surface of the side frame near the side frame connecting part, outer parts of the upper rib and the lower rib in the vehicle width direction are disposed in the same vehicle width direction as an outer surface of the side frame near the side frame connecting part.

11. The vehicle front structure of claim 10, wherein a distance of the upper rib in the suspension support members in the vehicle width direction is decreased toward a direction of the plate member toward the rear of the vehicle.

\* \* \* \* \*